March 3, 1953　　J. S. HASBROUCK ET AL　　2,630,105
RADIAL ENGINE

Filed Jan. 28, 1949　　11 Sheets-Sheet 1

Inventors
John S. Hasbrouck
Leslie C. Small Jr.
by Charles A. Warren
Attorney

March 3, 1953     J. S. HASBROUCK ET AL     2,630,105
RADIAL ENGINE
Filed Jan. 28, 1949     11 Sheets-Sheet 2
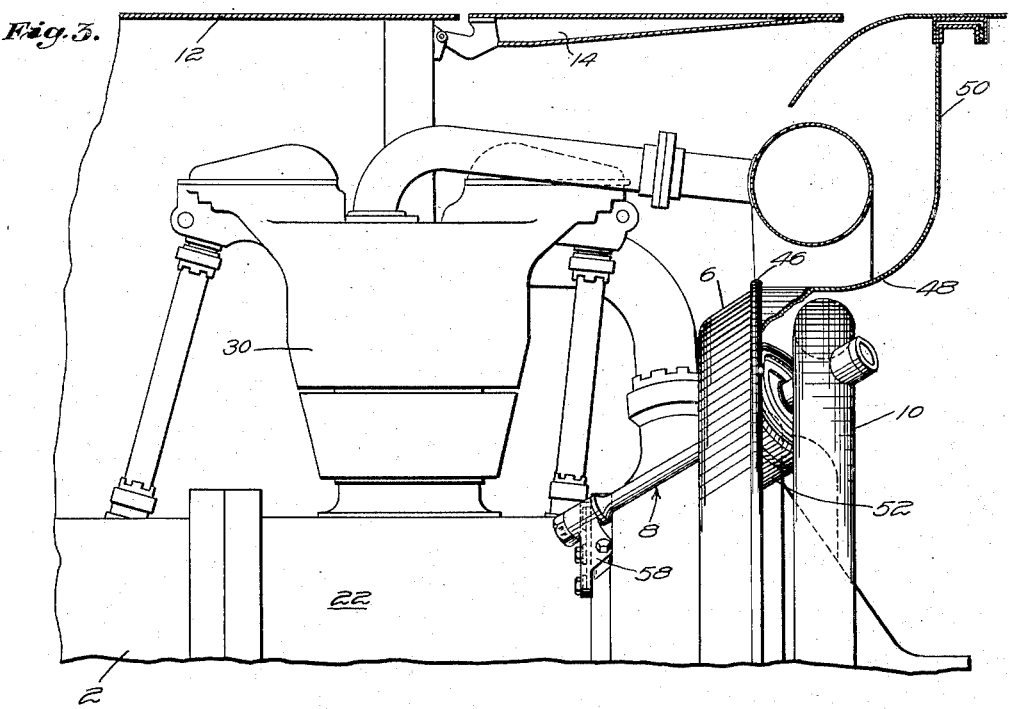
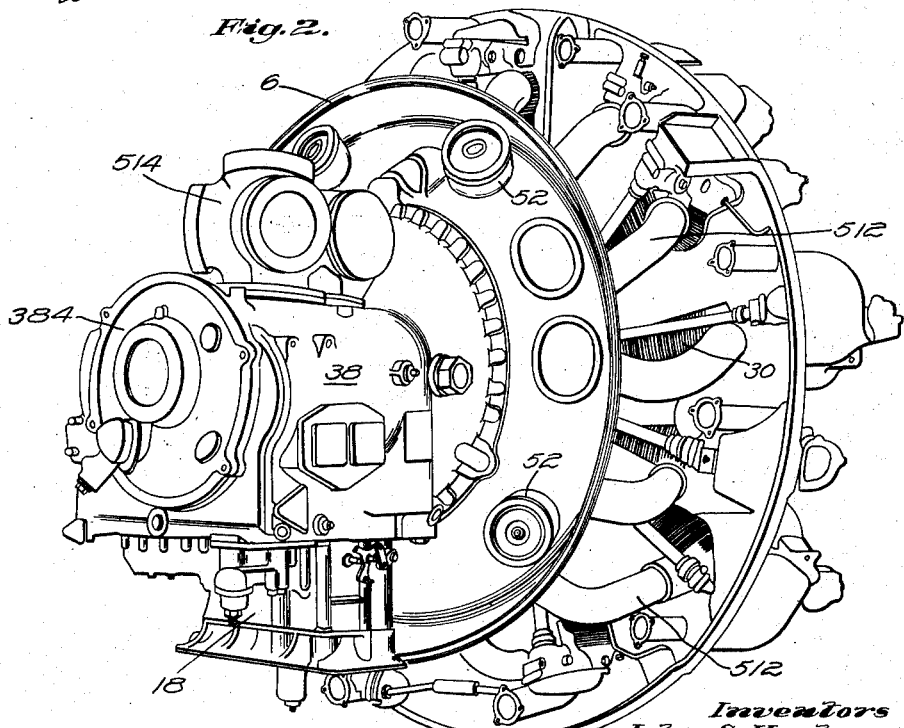

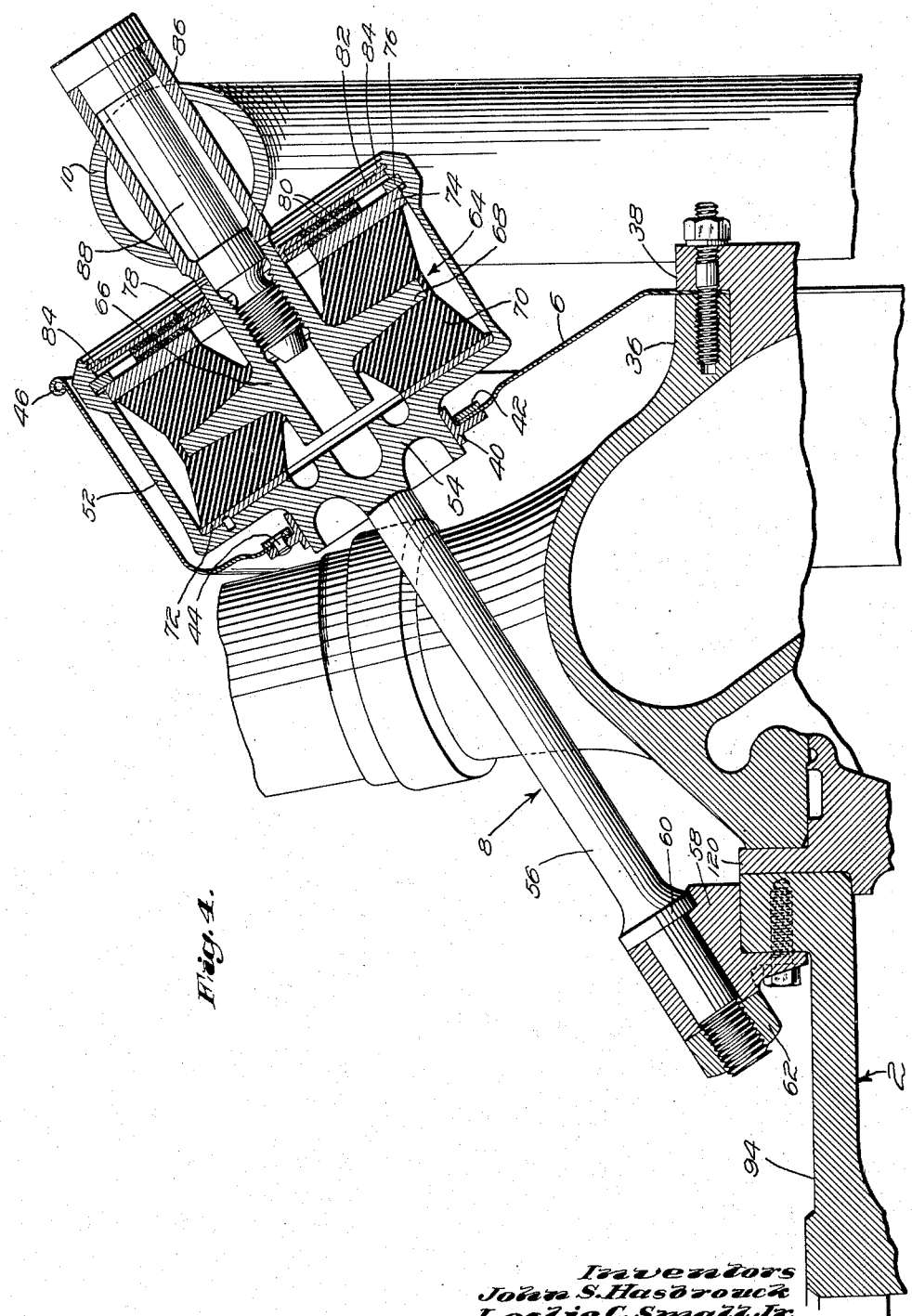

March 3, 1953 J. S. HASBROUCK ET AL 2,630,105
RADIAL ENGINE
Filed Jan. 28, 1949 11 Sheets-Sheet 6
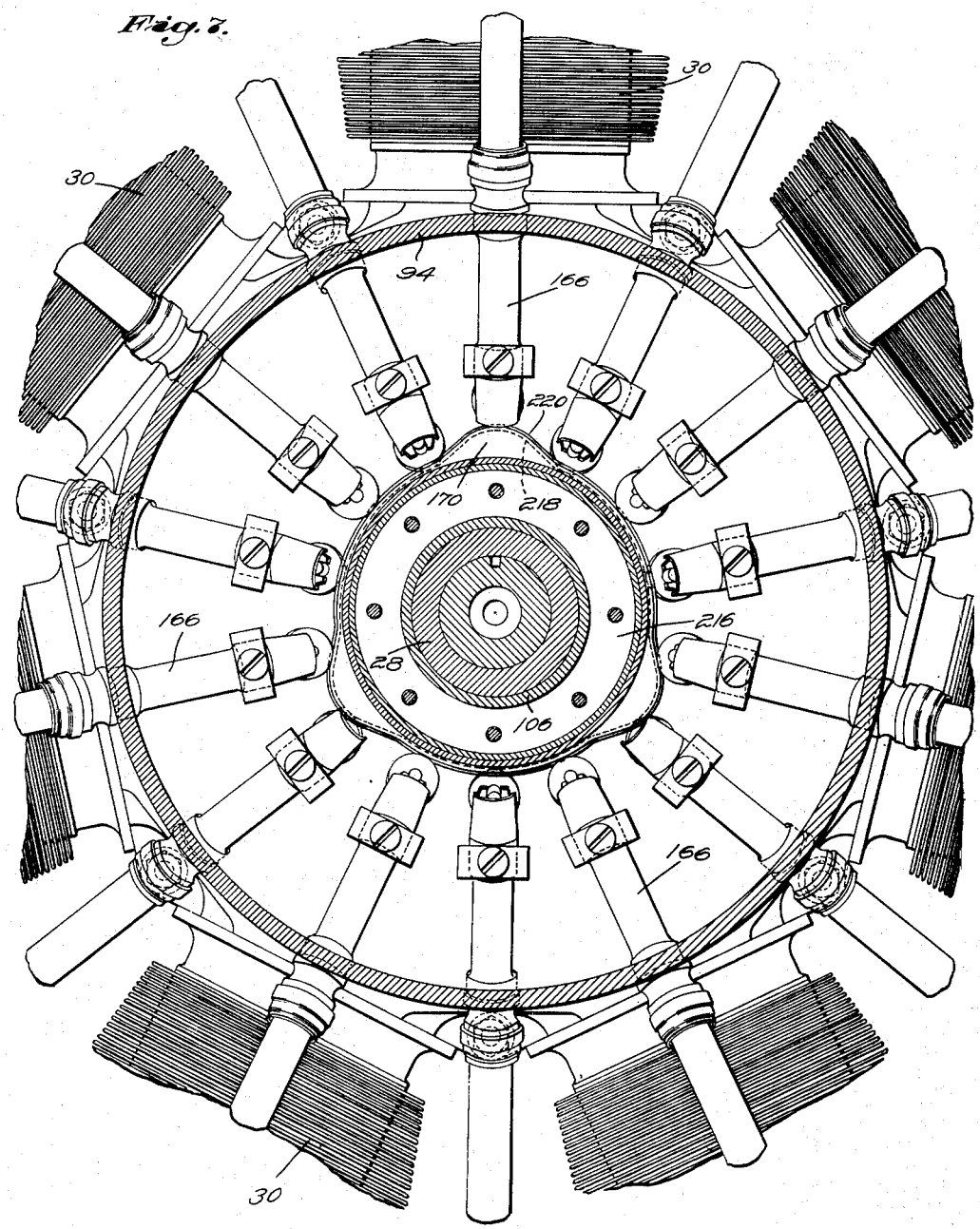

March 3, 1953
J. S. HASBROUCK ET AL
2,630,105
RADIAL ENGINE
Filed Jan. 28, 1949
11 Sheets-Sheet 7
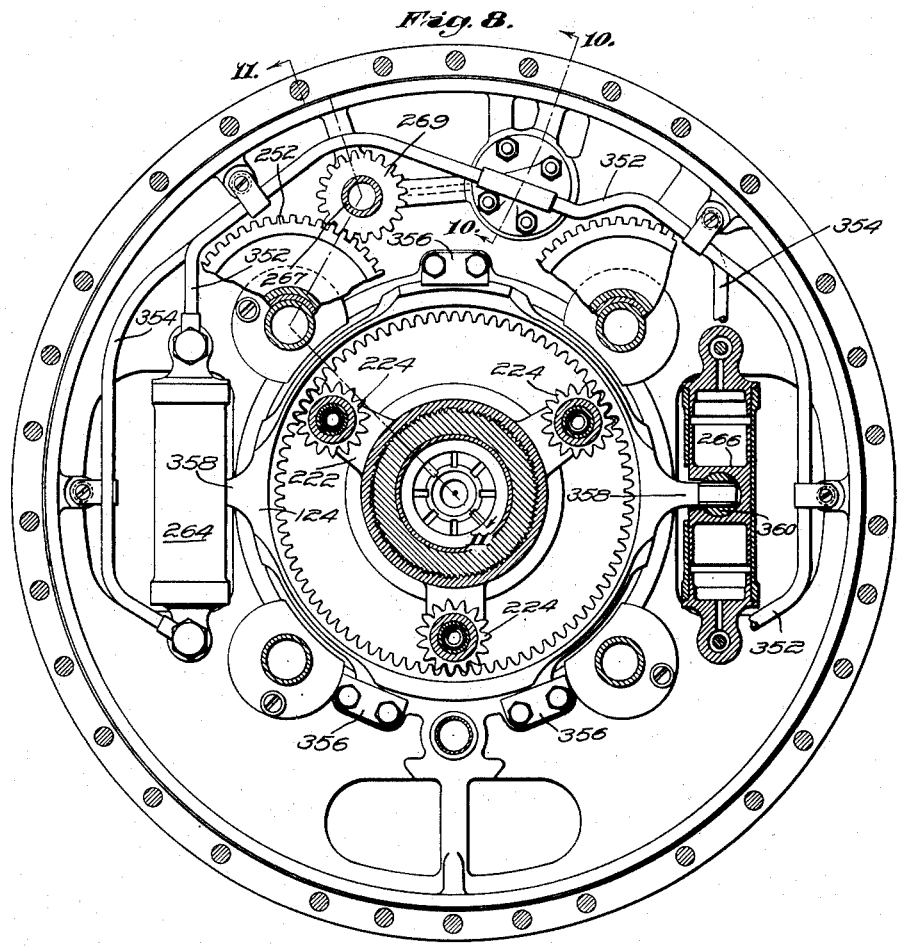
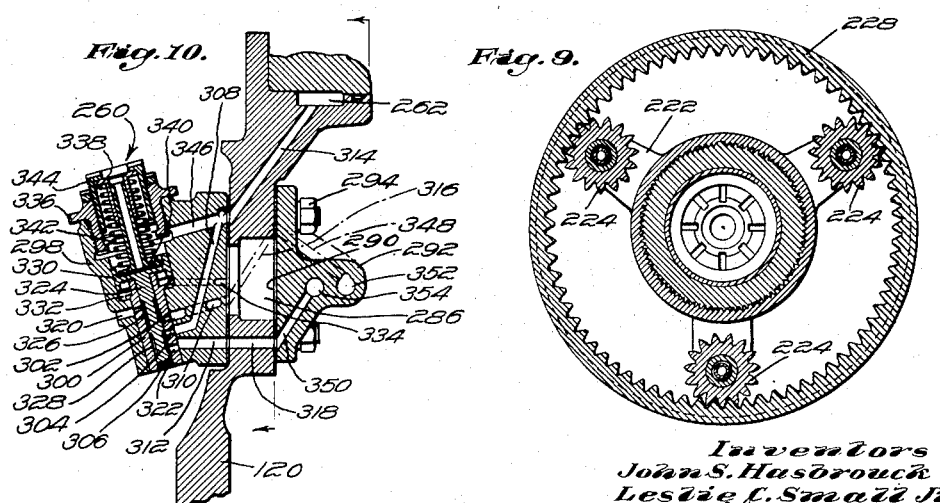
Inventors
John S. Hasbrouck
Leslie C. Small Jr.
by Charles A. Warren
Attorney March 3, 1953     J. S. HASBROUCK ET AL     2,630,105
RADIAL ENGINE
Filed Jan. 28, 1949     11 Sheets-Sheet 8
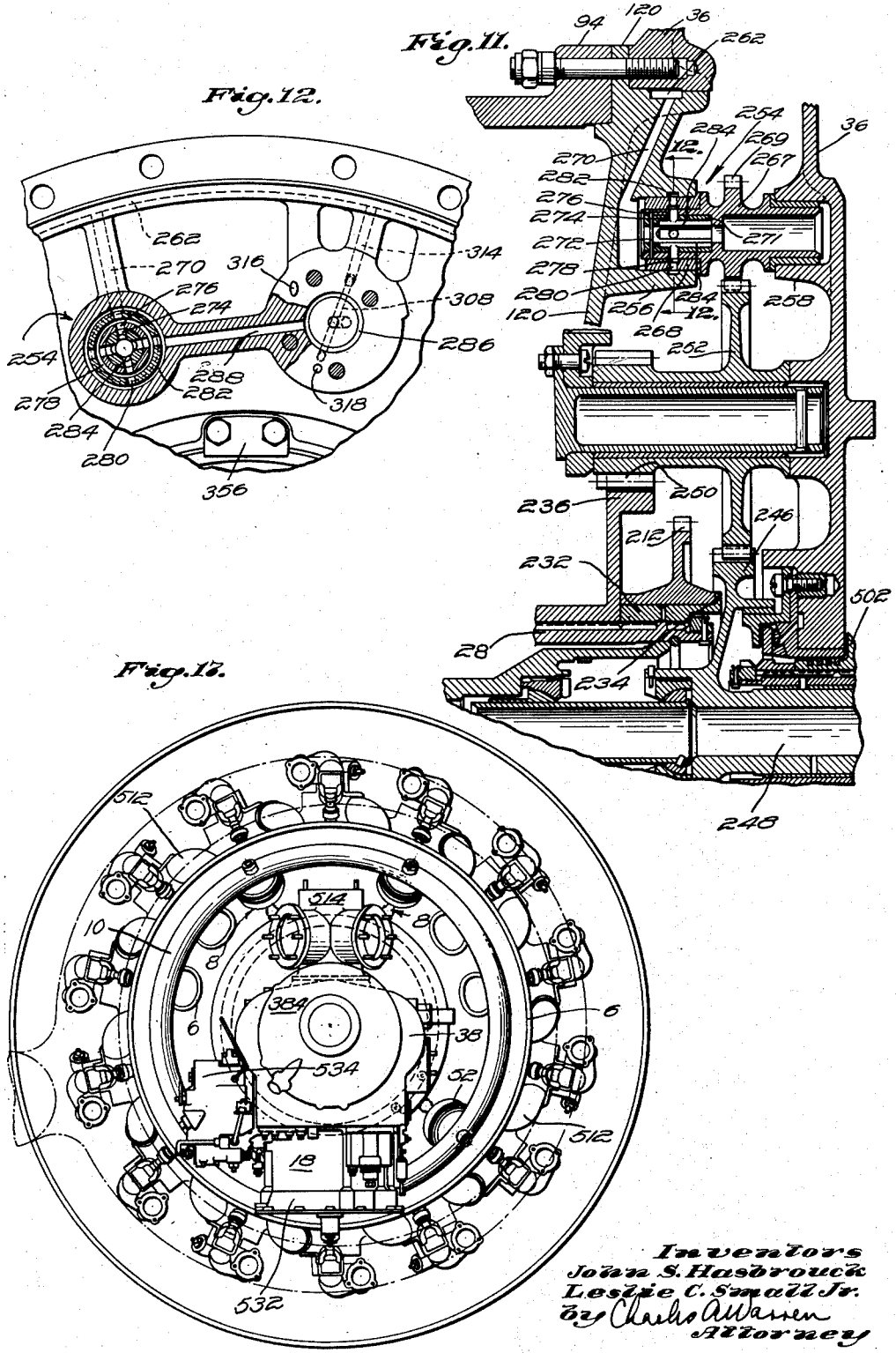
Inventors
John S. Hasbrouck
Leslie C. Small Jr.
by Charles A. Warren
Attorney

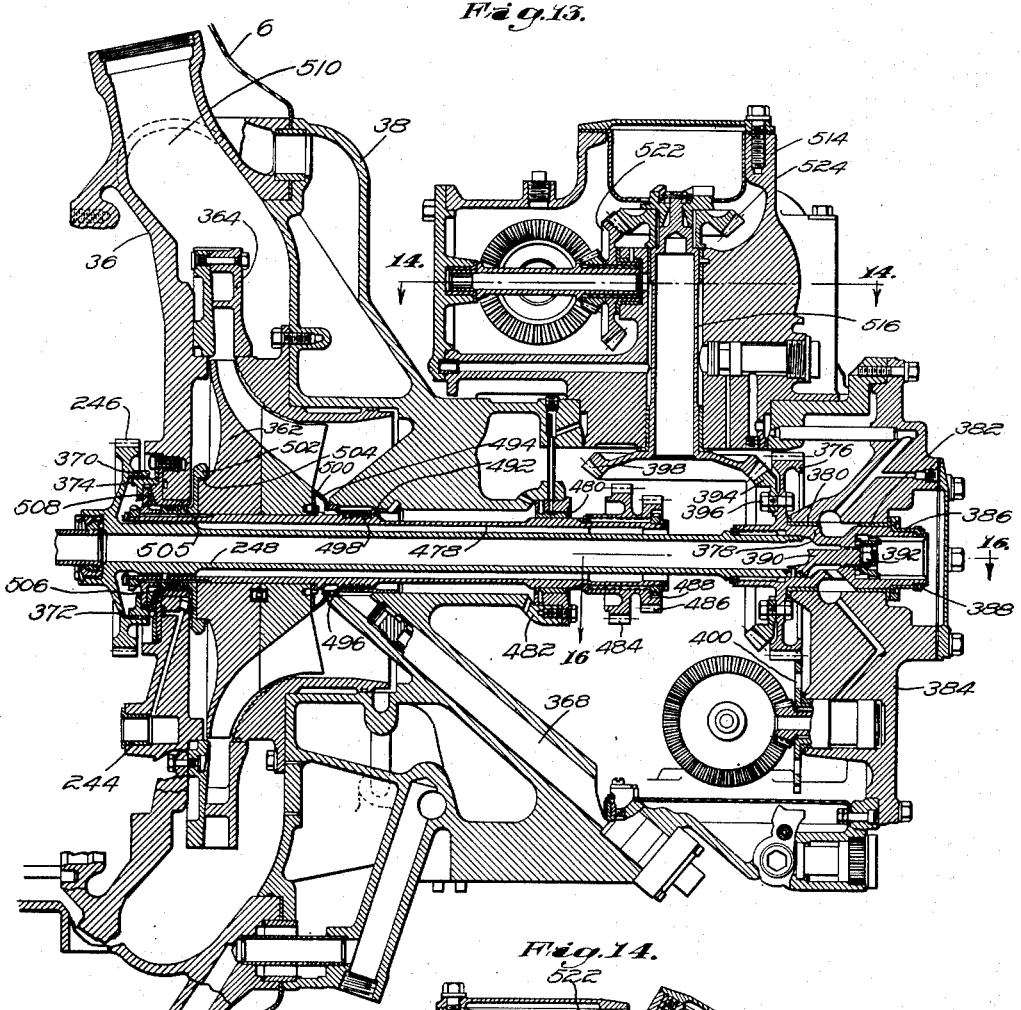
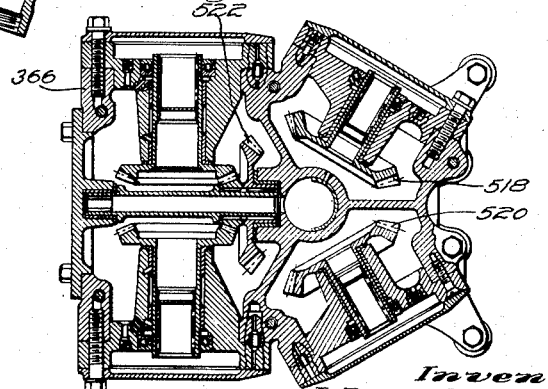

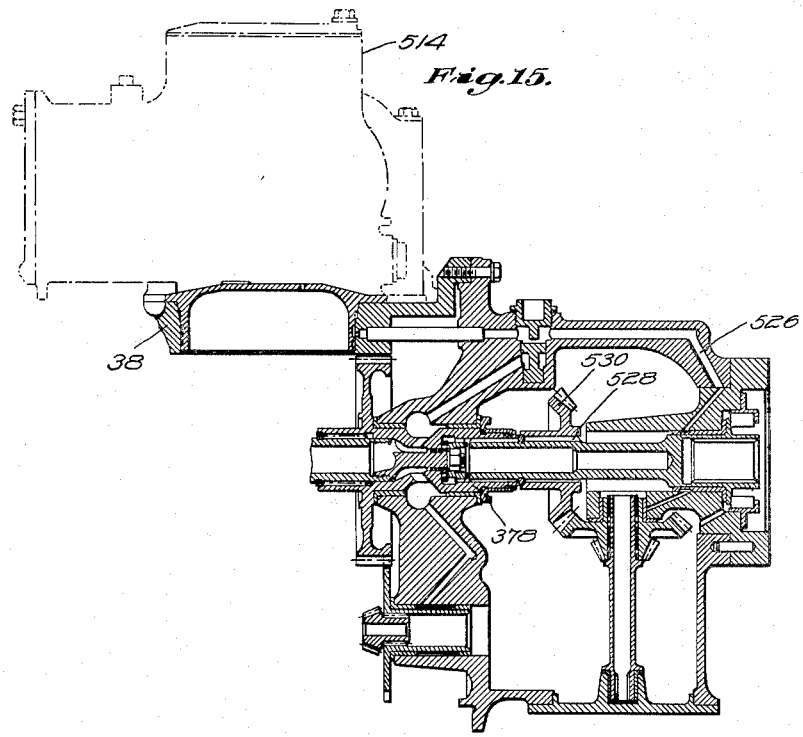

March 3, 1953

J. S. HASBROUCK ET AL 2,630,105

RADIAL ENGINE

Filed Jan. 28, 1949

Inventors
John S. Hasbrouck
Leslie C. Small Jr.
By Charles A. Warren
Attorney

Patented Mar. 3, 1953

2,630,105

UNITED STATES PATENT OFFICE 2,630,105

RADIAL ENGINE

John S. Hasbrouck, Glastonbury, and Leslie C. Small, Jr., South Glastonbury, Conn., assignors to United Aircraft Corporation, East Hartford, Conn., a corporation of Delaware Application January 28, 1949, Serial No. 73,404

2 Claims. (Cl. 123—55)

1

This invention relates to a multi-row radial engine.

An object is to provide a novel and improved combination and arrangement of the valve cam and gearing so that an automatic two position valve overlap is provided to enable the engine to produce additional power in the higher power range and to reduce the loads and wear in the system.

One feature of the invention is the use of a single cam for actuating all the intake valves in a two-row radial engine. A similar arrangement may be used for all the exhaust valves of the cylinder.

Another object of this invention is to provide a new combination and arrangement of engine parts of the accessory drive which will provide extreme flexibility to accommodate the requirements of any aircraft accessory system.

An object is to provide improved means for flexibly mounting an aircraft engine on an aircraft carried engine support, and more particularly to provide a fire seal diaphragm as part of the engine which will support the engine in torque and thus eliminate duplication of parts.

Other objects and advantages will be apparent from the specification and claims, and from the accompanying drawings which illustrate an embodiment of the invention.

Fig. 2 is a perspective view of the engine from the rear.

Fig. 3 is a fragmentary side elevation on a somewhat larger scale showing a part of the engine mount structure.

Fig. 4 is an enlarged sectional view through one of the engine mounts and showing its relation to the diaphragm.

Fig. 7 is a transverse sectional view along the line 7—7 of Fig. 5 showing cam and tappets for the intake valves.

Fig. 8 is a transverse sectional view along the line 8—8 of Fig. 5 showing the mechanism for adjusting the valve overlap by changing the timing of the intake valve actuation.

Fig. 9 is a transverse sectional view along the line 9—9 of Fig. 5 showing a detail.

Fig. 10 is a sectional view along the line 10—10 of Fig. 8 showing the control valve for the change in the valve overlap.

2

Fig. 11 is a longitudinal sectional view along the line 11—11 of Fig. 8 showing the centrifugal pump and its drive from the engine crankshaft.

Fig. 12 is a fragmentary elevation of the pump housing and adjacent oil reservoir as seen from the right in Fig. 11.

Fig. 13 is a longitudinal sectional view through the rear section.

Fig. 14 is a longitudinal sectional view on the line 14—14 of Fig. 13.

Fig. 15 is a fragmentary sectional view showing a modified arrangement of the accessory mounting.

Figure 16:
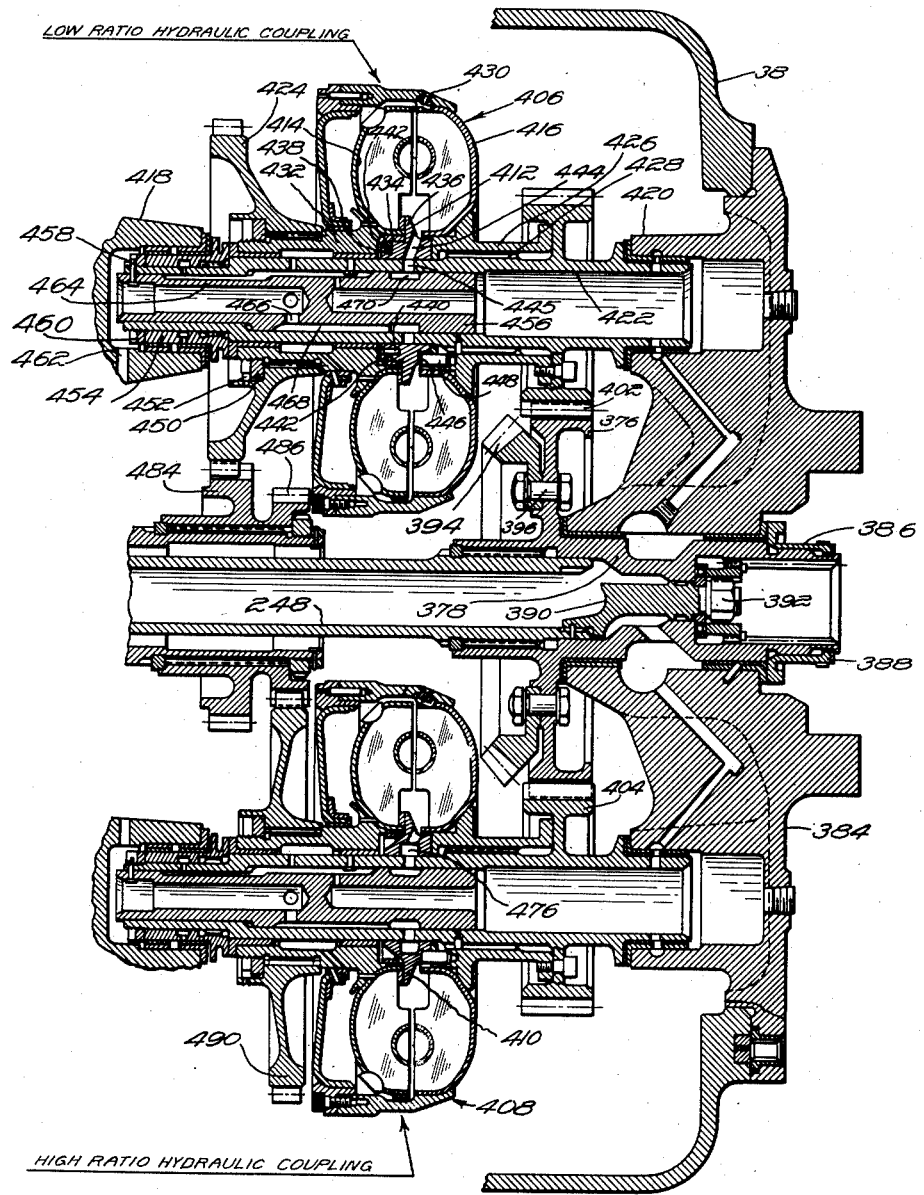

Fig. 16 is a longitudinal sectional view on the line 16—16 of Fig. 13.

Fig. 17 (Sheet 6) is an elevation of the rear section of the engine as seen from the rear and with the accessory mounting as in Figs. 13 and 14.

Figure 1:
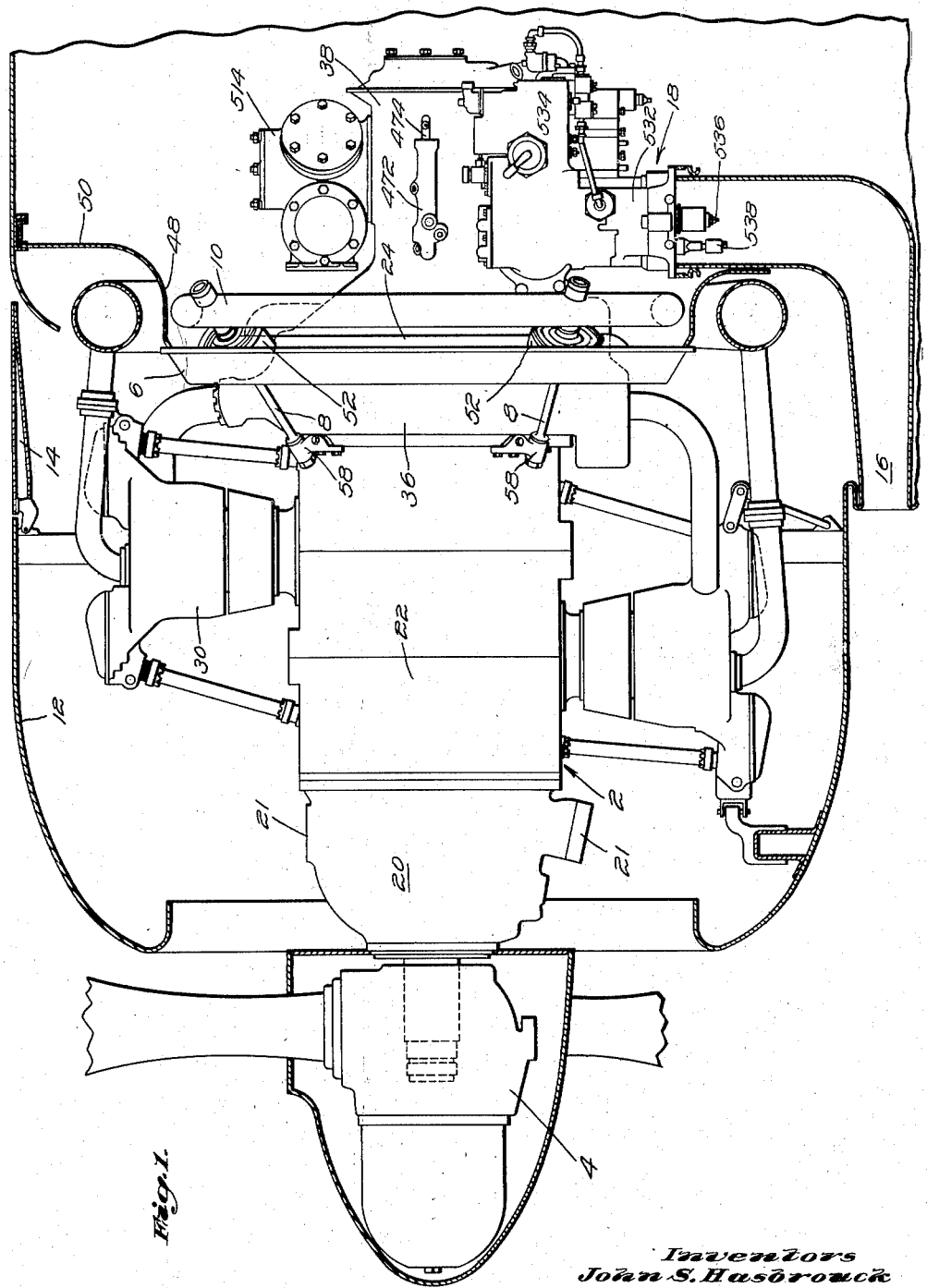
Fig. 1 is a side elevation of the power plant installed in an aircraft.

Referring first to Fig. 1, a two-row air-cooled radial aircraft engine 2 drives a propeller system 4 mounted thereon. The engine is connected by a mounting diaphragm 6 and engine mounts 8 to a supporting ring 10 on the airplane. The engine is enclosed within a nacelle 12 which may have conventional cowl flaps 14. Air enters the nacelle through an inlet 16 to carburetor 18.

Engine 2 consists of three main sections, the nose section 20, the power section 22 and the rear section 24. The nose section 20 contains the reduction gear assembly (not shown) for the propeller system 4 and has provisions for the mounting of various accessories or devices on bosses 21 on its exterior. Power section 22 includes the crankcase 26, Fig. 5, the crankshaft 28 journalled therein, and the cylinders 30 externally of said crankcase in which the pistons 32 reciprocate. Pistons 32 are connected to the crankshaft by piston rods 34. The rear section 24 consists of the blower case 36 and the rear case 38.

Engine 2 is connected to supporting ring 10 by the diaphragm 6 and four engine mounts 8. One of the mounts 8 is shown in detail in Fig. 4 and in a mounted position in Figs. 1 and 3.

The circular diphragm 6 is fixedly mounted on the engine 2 between the blower case 36 and the rear case 38. Four bushings 40 which receive the engine mounts 8 are retained therein by a retaining ring 42 and rivets 44. The outer rim 46 of the diaphragm engages a conical flange 48 on the firewall 50 in the nacelle 12 to form a continuation of the wall.

Referring first to Fig. 4, each mount unit includes a core housing 52 with a hub 54 fitting in the bushing 40. This housing 52 has integral therewith a rigid, forwardly extending strut 56 fastened at its lower end to a bracket 58, Fig. 3, bolted to the engine crankcase. The strut 56 may have a flange 60 engaging one side of the bracket 58 and held thereon by a clamping nut 62.

A flexible core 64 in housing 52 consists of a metal ring 66 having a flange 68 extending therefrom surrounded by a rubber core 70 bonded thereto. Rubber core 70 has a metal plate 72 bonded to the bottom and a similar metal plate 74 bonded to the top. When assembled, flexible core 64 is within its housing 52, and top plate 74, having a centrally located opening, is fixed to said housing to retain said flexible core by snap ring 76.

Improved frictional damping means are associated with each mount acting in parallel with the shear action of the rubber core 70. This means comprises a metal plate 78 having frictional material 80 on opposite faces thereof in a position to engage the outer surface of top plate 74 and the inner surface of a Belleville spring 82 stressed into a flattened condition to urge the parts constantly into frictional engagement. Spring 82 is held in place by a snap ring 84.

The ring 10 is provided at each engine mount unit location with a stud receiving sleeve 86 which extends through the cross section of the ring and is permanently welded thereto, this sleeve being axially aligned with strut 56 and housing 52.

The mount 8 can be attached to the bracket 58 and diaphragm 6 by inserting the free end of strut 56 through bushing 40 of the diaphragm and into the bracket, being held therein by the nut 62.

Ring 66 has a centrally located threaded bore accessible through the top plate 74, which is aligned with the sleeve 86 when the engine is in position in the nacelle. A threaded stud 88 is inserted through the sleeve and screwed into said bore forming a rigid connection. Details of a similar mount are disclosed in Tyler et al. application Serial No. 579,542, filed February 25, 1945.

Crankcase 26 of the power section 22 consists of three sections 90, 92 and 94 secured together as by bolts 96. These three sections have partitions 98, 100 and 102, respectively, each of which has a large centrally located bore 104 carrying a bearing 106 for the crankshaft, the bearings in partitions 98 and 102 being retained in any well-known manner. However, the bearing in partition 100 is retained by two snap rings 108 which engage grooves in a ring 110 fixedly secured within the bore 104 of this partition.

The front row of cylinders are located between sections 90 and 92 of the crankshaft and the rear row between sections 92 and 94. The cylinders may be held in position by bolts 111 extending outwardly through the crankcase sections to engage a flange 112 on the cylinder. The bolts may have serrations on the part fitting in the crankcase section to prevent turning of the bolt during assembly or operation.

A front support plate 113 is mounted on the forward end of the crankcase and has a large centrally located bore 114 which carries a bearing 116 for the shaft 126. This plate 113 is retained between the nose section 20 and the crankcase 26 by the bolts 118 which also hold the nose section in position.

A similar rear support plate 120 also has a large centrally located bore 122 in which the rear variable-position gear 124 is mounted for changing valve overlap. This plate 120 also supports the mechanism for automatically changing the position of "fixed" gear 124, hereinafter described.

The propeller drive between the engine and the reduction gear is a shaft 126 which is decoupled from the crankshaft 28 (see Fig. 5) by a splined sleeve 128. The forward end of the crankshaft 28 has an externally splined member 130 mounted thereon with its splines 132 in engagement with internal splines 134 on the sleeve. Sleeve 128 has other internal splines 136 engaging with an external set of splines 138 on shaft 126. The splines are loose enough to permit a relative lateral movement between the shaft 126 and the crankshaft to provide the decoupling effect. A snap ring 140 is provided internally of sleeve 128 to locate the sleeve axially.

Figure 5:
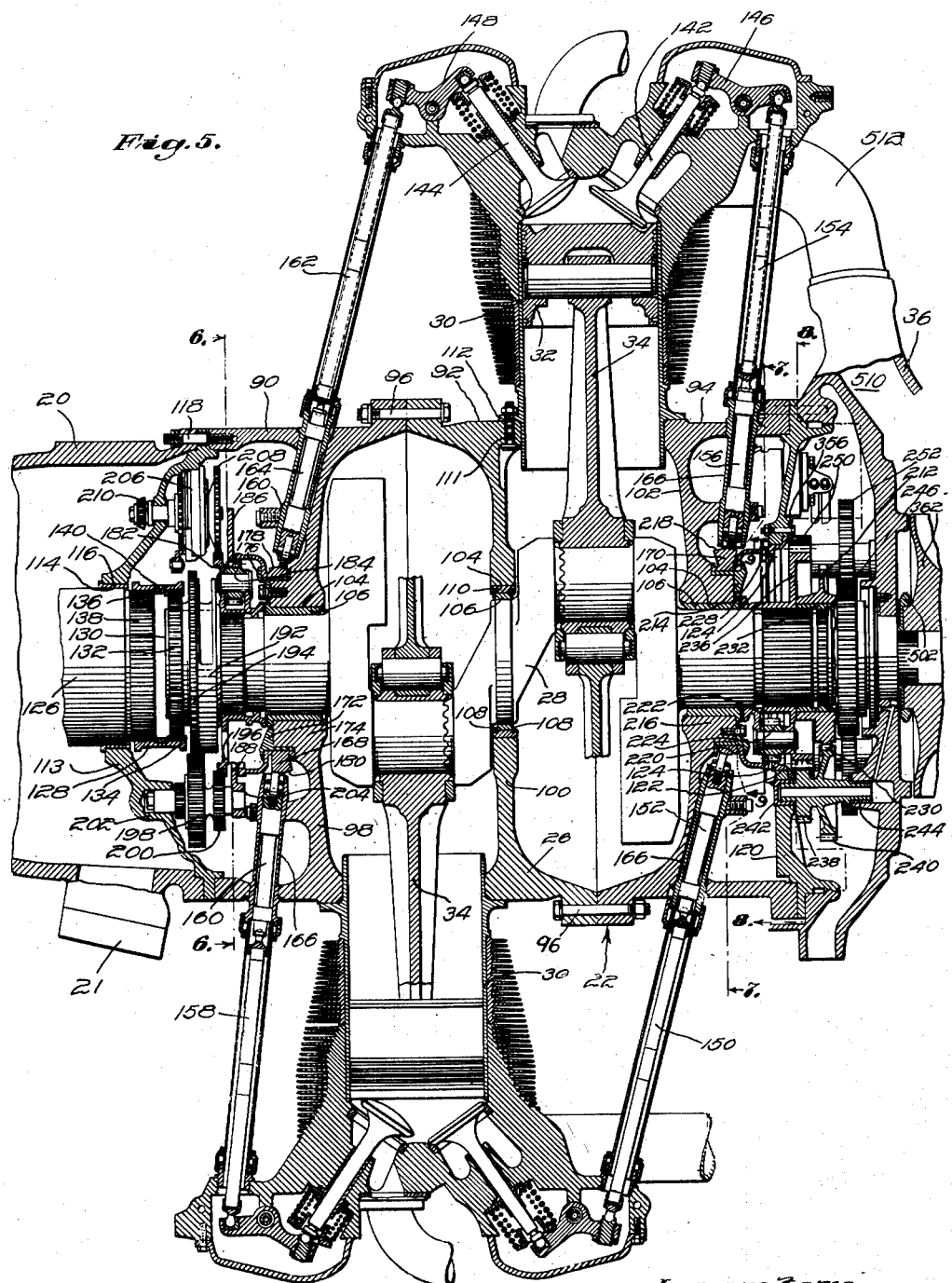
Fig. 5 is a longitudinal sectional view of the power section of the engine.

The valve mechanism is of the overhead rocker box poppet valve type utilizing one intake valve 142, Fig. 5, and one exhaust valve 144 in each cylinder. An intake valve rocker arm 146 is pivoted in one of the two fore-and-aft rocker boxes located on the top of each cylinder and an exhaust-valve rocker arm 148 is pivoted in the other. The rocker arms for all the intake valves in both rows are actuated by push rods 150 and valve tappets 152 for the forward row of cylinders, and push rods 154 and valve tappets 156 for the rear row.

The exhaust valves for both rows of cylinders are similarly actuated by push rods 158 and tappets 160 for the front row and push rods 162 and tappets 164 for the rear row. The arrangement is in general similar to that shown in the Willgoos Patents Nos. 2,401,210 and 2,401,211, issued May 28, 1946, except that the tappets are mounted in tappet guides 166 in the crankcase in such a way as to form a continuous straight line from the rocker arms to the actuating cam ring 168 for the exhaust valves and the cam ring 170 for the intake valves.

Figure 6:
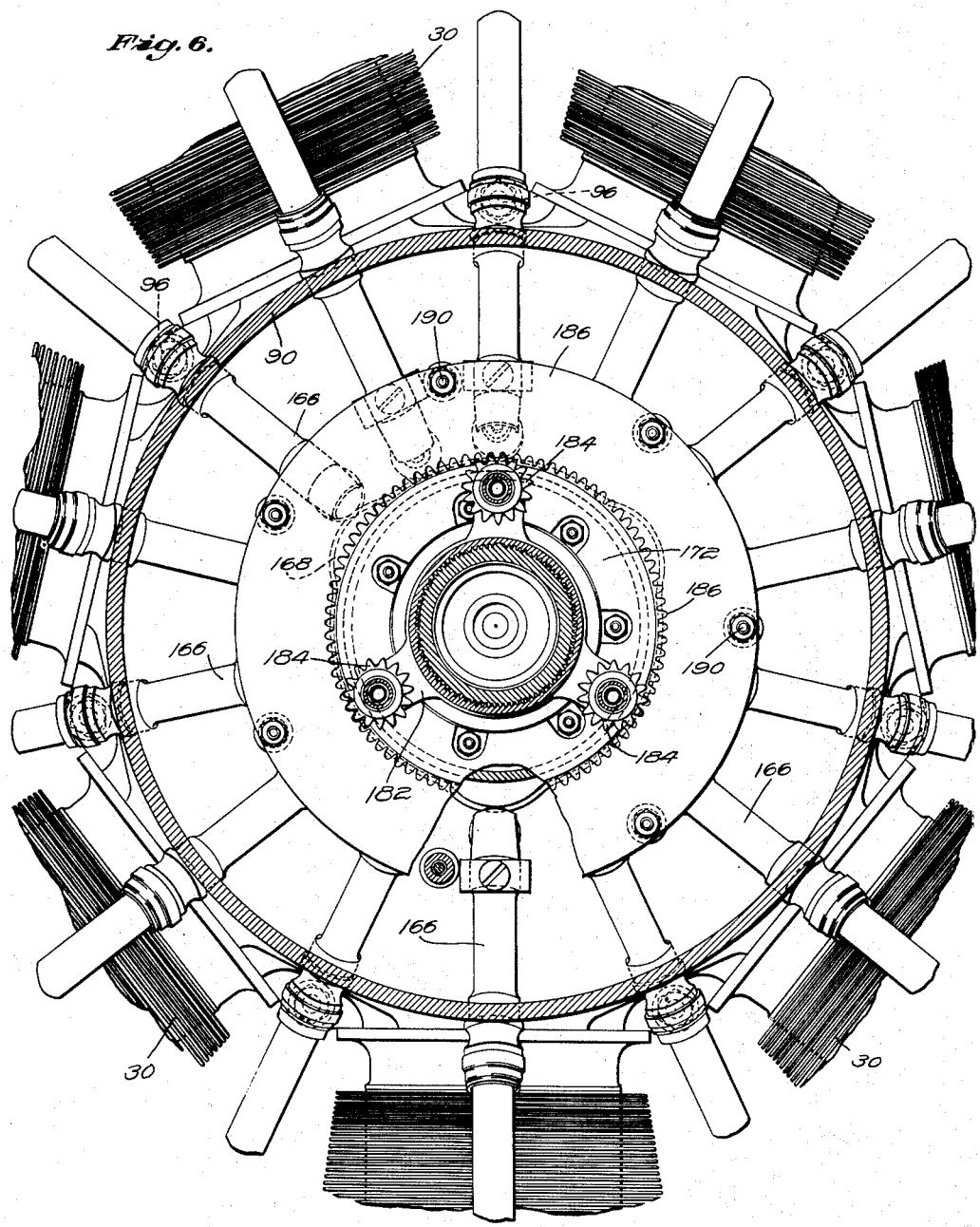
Fig. 6 is a transverse sectional view along the line 6—6 of Fig. 5 showing an actuation of the exhaust valve tappets.

Circular bearing 172 is fixed to a hub 174 on the front of partition 98 around the crankshaft opening and has a flange 176 to guide the cam ring 168. This ring has two conical cam faces 178 and 180. Cam face 178 operates all exhaust valves 144 of the front row of the engine and cam face 180 operates all the exhaust valves of the rear row of the engine through their respective tappets, push rods and rocker arms, as stated heretofore. The cam ring 168 is rotated at a fraction of crankshaft speed by a reduction gearing composed of a spider 182 splined to the crankshaft and carrying pinions 184 which mesh with two ring gears 186 and 188. Gear 186 is fixed, being secured to said crankcase by bolts 190 (see Fig. 6). The other ring gear 188 is integral with said cam ring. Gear 186 has a larger number of teeth than gear 188 on the cam ring so that as the pinions are rotated by the crankshaft the cam ring will be rotated at a slower speed proportional to the crankshaft speed.

Cam faces 178 and 180 are substantially conical, as above stated, and in opposition to each other so that the axial thrust exerted by one set of tappets is balanced by the thrust from the other set of tappets.

In the front of the power section is a front secondary counterbalance 192 which has an external gear 194 connected thereto. The counterbalance is mounted to rotate on the crankshaft at twice crankshaft speed by means of a step up gearing system. This system consists of gear 194, a gear 196 on spider 182 and an interconnecting gear unit consisting of two gears 198 and 200 integrally connected. Gear 196 meshes with gear 200 thereby imparting motion to gear 198, which meshes with gear 194 on the counterweight. Through appropriate selection of gear sizes any ratio between the speeds of the crankshaft and the counterweight can be obtained. Gears 198 and 200 are mounted for rotation between a front bearing 202 on the front support plate and a rear bearing 204 in the fixed ring gear 186.

Also mounted on the front support plate is the drive unit 206 for the magneto (not shown) and propeller governor (not shown). This drive unit has a gear 208 driven by gear 196. Bevel gear 210 is one of the three gears driven by the unit 206 (other two gears not shown).

In the rear of crankcase 26 are mechanisms similar to those located in the front of the crankcase for rotating the cam ring 170 and for rotating the rear secondary counterbalance 212. Also located at the rear of the crankcase is a mechanism for changing the angular position of rear cam ring 170 in relation to the front cam ring. A bearing 214 for the cam ring is fixed to a hub 216 on partition 102 and has a flange engaging laterally with the ring. The cam ring 170 has two conical cam faces 218 and 220, the former operating all the intake valves 142 of the front row of cylinders of the engine, and cam face 220 operating all the intake valves of the rear row through their respective tappets, push rods and rocker arms, as stated heretofore.

Cam ring 170 is rotated at a fraction of crankshaft speed by a reduction gearing similar to that for the exhaust valves. This gearing is composed of a spider 222 splined to the crankshaft and carrying pinions 224 which mesh with two ring gears 124 and 228. Gear 124 is a variable-position ring gear adapted to be moved into either of two positions, "advanced" or "retarded," to be described hereinafter, and the other ring gear 228 is integral with said cam ring. The rear secondary counterbalance 212, like the front counterbalance has an external gear 230 connected thereto and is mounted on a bearing ring 232 splined to the crankshaft and held thereon by any well-known means. Counterbalance 212 is rotated at twice crankshaft speed by means of a step-up gearing system consisting of the aforementioned gear 230, gear 236 on spider 222 and jack-shaft gears 238 and 240 integrally connected. The operation of this mechanism is exactly the same as for the front counterbalance. Gears 238 and 240 are mounted for rotation between a front bearing 242 on the rear support plate and a bearing 244 on blower case 36. Also mounted between the rear support plate 120 and blower case 36 are four gear units which drive gear 246 and accessory drive shaft 248. These units consist of two gears 250 and 252 integrally connected. Gear 236 on spider 222 meshes with gear 250 forming a driving connection from the crankshaft, and gear 252 meshes with gear 246 thereby driving shaft 248.

The variable position ring gear 124 is shifted by fluid pressure from a pump which delivers fluid at a pressure proportional to engine speed. This pump 254 is also mounted between the rear support plate 120 and blower case 36 in bosses 256 and 258, respectively. This pump supplies the fluid pressure to actuate a valve 260 which directs the flow of oil from annular groove 262 in the rear support plate to alternate ends of cylinders 264 mounted on the rear support plate and having pistons 266 therein connected to the variable-position gear 124 for shifting it.

Valve 260 controls the flow of operating fluid from annular groove 262 to cylinders 264 and is actuated at a certain engine speed, to be described later, which bears a direct relationship to the fluid pressure, since pump 254 is geared to the crankshaft.

As viewed in Fig. 11 pump 254 has a shaft 267 one end of which is in a bushing 268 in boss 256. Shaft 267 receives its rotation from one of the gears 252 above described, meshing with a gear 269 integrally provided on the shaft. From annular groove 262 fluid reaches the pump through passage 270 in the rear support plate. This end of pump shaft 267 has a recess to receive a sleeve 271 held against rotation by pin 272. Four radial ports 274 in sleeve 271 coincide with ports 276 in the pump shaft which in turn enter into an annular groove 278 in bushing 268. Four ports 280 in said bushing connect annular groove 278 to an annular groove 282 in boss 256. Ports 274 in sleeve 271 are intersected by longitudinal grooves 284 which facilitate the flow of oil to the ports owing to the centrifugal force set up by the rotating pump shaft.

Noting Fig. 12, fluid delivered by pump 254 is carried from annular groove 282 to a reservoir 286 in the rear support plate by passage 288. This reservoir is formed between a flat side of valve 260 and an inside flat surface 290 of face plate 292. Valve 260 is bolted through rear support plate 120 to plate 292 by bolts 294.

Referring now to Fig. 10, valve 260 indicates a valve body 298 having a stepped hole of three different diameters decreasing from top to bottom. A sleeve 300, securely fixed within the lowest bore, has ports 302, 304 and 306 which coincide with passages 308, 310 and 312 of the valve body, the latter being in turn connected to passages 314, 316 and 318 in rear support plate. The sleeve also has drain ports 320 and 322. Sleeve 300 extends halfway up into the middle bore.

Servo valve 324 in sleeve 300 has two spaced annular grooves 326 and 328 for directing the operating fluid from the annular groove 262 to the end of the cylinders called for by the speed of the engine, and for connecting the opposite ends of the cylinders to drain. This servo valve 324 is integrally connected to a larger piston 330 which fits in the middle bore. This larger piston in its downward position rests on sleeve 300 which extends up into this bore as previously mentioned. By this arrangement a chamber 332 is formed beneath the piston 330. This chamber is connected by a passage 334 into reservoir 286 in which fluid under pressure from pump 254 is contained.

The largest diameter of bore on the valve body is internally threaded to receive externally threaded member 336 which is suitably locked in position and which in turn is internally threaded. A spring unit is inserted within member 336 consisting of two spring guides 338 and 340, having sliding engagement therebetween, and spring 342. This unit is placed with guide 340 against piston 330 and guide 338 against adjusting member 344 which is externally threaded and screwed into member 336 to adjust the amount of spring tension placed on servo valve 324. The more tension placed thereon, the higher the pressure in chamber 332 has to be to raise piston 330 and thereby servo valve 324, which depends directly on engine speed. So, this valve 324 can be adjusted through member 344 to operate at a specified engine speed, and direct operating fluid to the opposite sides of cylinders 264. The valve bore is connected by a passage 346 through valve body and the passage 314 in rear support plate to annular groove 262.

For directing fluid from the control valve to the cylinders, passages 316 and 318 of rear support plate are connected to passages 348 and 350, respectively, of face plate 292. This face plate supports tubes 352 and 354.

Tube 354 carries operating fluid to the cylinders 264 when the servo valve is down or in "retarded" position and tube 352 carries operating fluid to the other ends of the cylinders when the servo valve is in up or "advanced" position.

When the engine speed has reached a point where the pump pressure (that is, the pressure in the reservoir) has become high enough to overcome the spring tension set against piston 338, servo valve 324 moves to its up or "advanced" position. Now tube 352 carries operating fluid to the actuating cylinders and tube 354 carries fluid from the other ends of the cylinders to drain. As the engine speed decreases the pressure in the reservoir decreases and when this pressure reaches the point where the force exerted by the spring is greater than the fluid pressure, servo valve 324 is moved to its down or "retarded" position by the spring.

The movement of the pistons 266 within the cylinders 264 is transmitted to cam 170 to place it in "advanced" or "retarded" position in the following manner. Variable-position gear 124, which is mounted for movement between rear support plate 120 and three brackets 356 bolted to support plate 120, has two projections 358 which are 180° apart and which extend through openings in cylinders 264 and into cylindrical joints 360 mounted in the movable pistons 266. As the pistons move from one end of the cylinder to the other, gear 124 moves from one position to the other carrying the three pinion gears 224 therewith, thereby moving ring gear 228 and cam ring 170 angularly a like amount. This movement of cam 170 changes its angular position with respect to cam 168. This angular change varies the valve overlap of the exhaust and intake valves and enables the engine to produce additional power in the higher power range.

The rear section, as mentioned heretofore, consists of the blower case 36 and the rear case 38. Blower case 36 houses the supercharger impeller 362 and has a two piece diffuser 364 bolted thereto. Rear case 38 has the gear box 514 and carburetor 18 mounted thereon, and houses the two speed impeller drive along with the fuel injection nozzle 368 and other devices to be described later.

Referring now to Fig. 13, as previously mentioned, gear 246, and thereby accessory drive shaft 248, which is integrally connected thereto, is driven from crankshaft 20 through the above described step-up gear units. Accessory drive gear 246 has a rearwardly extending circular flange 370 encircling a bearing 372 mounted on a circular flanged ring 374 which is bolted to the blower casing. The accessory shaft extends longitudinally through the rear case.

The rear end of accessory drive shaft 248 is externally splined and fitted within an internally splined gear 376 which has an integral sleeve 378 journalled in two bearings 380 and 382 within a boss extending from rear cover plate 384. Sleeve 378 has a spline ring 386 mounted at its rearward end which is retained in place by a snap ring 388.

The splines of shaft 248 are held in engagement with the splines of gear 376 by a member 390 which has external splines on the forward end thereof and which is splined and pinned to internal splines on the end of shaft 248. This member extends through a small bore in sleeve 378 into a larger inside diameter and has a nut 392 on its outer end suitably locked in place.

Gear 376 has a bevel gear 394 mounted on the forward side thereof as by bolts 396. This bevel gear 394 engages bevel gear 398 of the accessory box mounted on top of the rear case. The gear 376 also directly drives gear 400 which is journalled in rear plate 384 and which drives other accessories. This gear 376 also drives gears 402 and 404, Fig. 16, of the low and high ratio hydraulic couplings 406 and 408.

The supercharger impeller 362 can be driven through either of the hydraulic coupling assemblies. Since both coupling assemblies are of identical construction except for two features only, the low ratio hydraulic coupling assembly will be described. The structural differences are the valve ring and the driving gear of each assembly. The high ratio coupling assembly merely has a ring 410 which serves as a spacer while the low ratio coupling assembly has a valve ring 412 which also prevents actuating fluid from entering the low ratio hydraulic coupling while the runner 414 is moving at a speed greater than that of the impeller 416.

The low ratio hydraulic coupling assembly 406 is mounted for rotation between boss 418 formed integral with the rear case 38 and boss 420 formed on the rear cover plate 384.

The main parts of the low ratio hydraulic coupling are the driven pinion gear 402 which is integral with a shaft 422, coupling impeller 416, runner 414, valve ring 412 and driving gear 424. Impeller 416 is mounted on a hollow shaft 426 which is internally splined at 428 to engage with splines on the shaft 422. Fluid discharge ports 430 are provided along the periphery of the impeller.

Runner 414 is mounted on a hollow shaft 432 journalled on shaft 422. A steel ring 434 is a press fit in the rear end of shaft 432 for engagement with valve ring 412.

Valve ring 412 shown only in the low-ratio hydraulic coupling assembly is a ring formed with a peripheral flange 436 extending from the center thereof being perpendicular on one side and frictionally engaging a similar surface on the runner. A groove 438 is formed around the forward end of the ring with four pins 440 extending across the bottom thereof. Two ring segments 442 covering less than 180° are provided with inwardly extending hook portions on the ends thereof. These ring segments 442 fit in groove 438 with their hooks extending down into said groove so as to come into engagement with the pins which are mounted in pairs closer together than the hook ends of the segments permitting the segments a short sliding movement with relation to the valve ring. These segments provide a frictional engagement with the steel ring 434. A passage 444 extends through ring 412 and is aligned with ports 445 in shaft 422 to permit actuating fluid to flow into the impeller. On the rear face of ring 412 is a cam groove 446 for engagement with a pin 448 for limiting the movement of the valve into open position.

Pinion gear 402 is integral with the shaft 422 on which the coupling assembly is mounted for rotation, the ends of the shaft fitting in the bearings in bosses 418 and 420. The impeller 416 is splined to shaft 422 with a flange on the shaft 426 being in engagement with gear 402 and bolted thereto.

Valve ring 412 may turn on shaft 422. Pin 448 projecting from the face of shaft 426 engages the cam groove 446 in said valve to cause it to rotate with the impeller 416. Runner 414 with its shaft 432 is placed over shaft 422 and has its two bearings in engagement with said shaft. Gear 424 is splined to shaft 432 of runner 414 and is held on by a lock nut 450 which is retained by a pin 452. A bushing and spacer 454 is placed over the end of shaft 432 and splined thereto, the outer surface forming a bearing surface for the assembled shafts in boss 418.

A shaft insert 456 located within shaft 422 defines actuating fluid passages and lubricating oil passages therein, a pin 458 retaining both lock nut 460 for spacer 454 and insert 456 in place. Actuating fluid enters boss 418 at passage 462 and is carried to ring valve 412 through bore 464, radial ports 466, groove 468 and annular groove 470 of shaft insert. The groove aligns with the ports 445 of shaft 422. While impeller 416 is rotating at a speed greater than runner 414, pin 448 in cam groove 446 of the ring valve 412 lines up passage 444 of the ring valve with port 445 of shaft 422. If runner 414 is rotating at a speed greater than impeller 416 the friction between the runner 414 and ring valve 412 will move ring valve to a position which will misalign passage 444 and port 445 to cut off the flow of fluid into the coupling.

This arrangement is provided in the low ratio coupling. It is only when a change is being made from the high ratio coupling to the low ratio coupling that the coupling will tend to act as a brake and burn out since the runner of the low coupling is rotating faster than the impeller. So, when the pilot actuates valve 472 as by stem 474, Fig. 1, which valve selectively controls the flow of fluid to the couplings and passes the actuating fluid from the high ratio coupling to the low ratio coupling, the valve will permit no fluid to enter the low ratio coupling for a short period of time. When the runner of the low ratio coupling has slowed down to less than the speed of its impeller, ring valve 412 will automatically be moved by the relative rotation of the impeller and runner so that it will open to allow fluid to this coupling.

The corresponding ring in the high ratio coupling is made inoperative as a valve by placing an annular groove 476 around the inside of the ring.

Referring again to Fig. 13, supercharger impeller drive shaft 478 is mounted around the forward section of accessory drive shaft 248, and is supported at its rear end for rotation by bearing 480 which is retained in position in a boss 482 integral with rear case. Shaft 478 is supported for rotation at its front end on a bearing surface on the shaft 248. On the rear end of impeller drive shaft is a pair of gears 484 and 486 splined thereto and held in position by a lock nut 488. Gear 484 is driven through low coupling gear 424 and gear 486 is driven through the corresponding high ratio coupling gear 490 as described heretofore.

Midway of shaft 478 is a stationary sleeve member 492 which provides an annular groove to receive fuel from nozzle 368 for distribution to slinger 494 through openings 496. A seal 498 prevents fuel from passing back into the rear case. Slinger 494 is mounted on shaft 478 to rotate with it. Fuel is thrown from slinger 494 through openings 500 in the outer wall of the slinger.

The impeller is fastened to shaft 478 by a steel collar 502 which is shrunk over a boss 504 on the flat end surface of the impeller. This collar has an integral hub 505 splined to the shaft.

The forward end of shaft 478 has an annular flange 506 mounted between a bearing flange on the ring 374 and an associated bearing ring 508 to absorb the end thrust on the supercharger impeller. Air for the impeller reaches the inlet thereof through the carburetor 18, Fig. 1, and a passage, not shown, in the rear case and is discharged from the impeller into an annular duct 510 connected to the cylinder intakes through pipes 512, Fig. 5.

As above stated, the shaft 248 drives accessories in addition to the supercharger impeller. As shown in Fig. 13 the accessories, not shown, are intended to be mounted on suitable mounting flanges on a gear box 514 mounted on the top of the rear case and carrying the shaft 516 for the gear 398 above referred to. Any suitable arrangement of gears for driving the several accessories may be utilized, one particular arrangement being shown in the sectional view of Fig. 14 in which the several accessories are driven through suitable bevel gears 518, 520 and 522, all in mesh with a gear 524 on the upper end of the shaft 516.

In certain installations the locations of the accessories, as above described, may be different and the rear case is intended to provide for a drive of the accessories as mounted at the rear of the rear case instead of on top. As shown in Fig. 15, where the accessory case 514 is shown in phantom, it will be apparent that the rear cover plate 384, Fig. 13, may be removed and be replaced by an accessory gear box 526. In this event, the drive includes a splined sleeve 528 which fits within the splined end of the member 378, above described, and may carry a bevel gear 530 through which the various accessories may be driven.

It is also contemplated that either one of the gear boxes may be used separately or both gear boxes may be used in combination. In certain installations, the gear box may be remotely mounted by being connected to the engine by a flexible shaft in which event an oil pump becomes one of the accessories and furnishes lubrication for the gearing.

As shown in Figs. 1 and 17, the carburetor 18 may be in two separate units with the throttle body unit 532 mounted in the normal location on the carburetor mounting pad on the underside of the rear case. The regulation unit 534 is mounted on the rear case on a separate mounting pad provided for that purpose. These two units may be connected externally with the necessary linkage and internal passages may be provided in the rear case for the transfer of the various control fluids and pressures. In addition the throttle body unit may be in two separable sections so that the basic portion which contains the throttle valves is installed in the conventional position in the carburetor mounting pad by the secondary portion which contains the main Venturi plates as mounted wherever convenient in the air scoop. A conventional automatic mixture control structure 536 and a conventional temperature compensating unit may be provided with the rest of the carburetor.

It is to be understood that the invention is not limited to the specific embodiment herein illustrated and described, but may be used in other ways without departure from its spirit as defined by the following claims.

We claim:

1. A two row radial engine having two axially spaced rows of cylinders, a set of intake valves and a set of exhaust valves for said cylinders, a two-faced cam for actuating all of the set of intake valves, one face operating the intake valves of one row of cylinders, the other face operating the intake valves of the other row of cylinders, a two-faced cam for actuating all of the set of exhaust valves, one face operating the exhaust valves of one row of cylinders, the other face operating the exhaust valves of the other row of cylinders, the faces of each cam being located on adjacent sides of the cam and in opposition to each other so that the axial thrust exerted on one face approximately equals the thrust exerted on the other face.

2. A two row radial engine having two axially spaced rows of cylinders, a set of intake valves and a set of exhaust valves for said cylinders, a two-faced cam for actuating all of the set of intake valves, one face operating the intake valves of one row of cylinders, the other face operating the intake valves of the other row of cylinders, a two-faced cam for actuating all of the set of exhaust valves, one face operating the exhaust valves of one row of cylinders, the other face operating the exhaust valves of the other row of cylinders, the faces of each cam being located on adjacent sides of the cam and in opposition to each other so that the axial thrust exerted on one face approximately equals the thrust exerted on the other face, and means for changing the relative angular position of said cam rings.

JOHN S. HASBROUCK.
LESLIE C. SMALL, Jr.

REFERENCES CITED

The following references are of record in the file of this patent:

UNITED STATES PATENTS

| Number | Name | Date |
|---|---|---|
| 1,100,347 | Bourcier | June 16, 1914 |
| 1,256,833 | Scott | Feb. 19, 1918 |
| 1,654,366 | Fedden et al. | Dec. 27, 1927 |
| 1,708,458 | Willgoos | Apr. 9, 1927 |
| 1,752,055 | Angle | Mar. 25, 1930 |
| 1,863,875 | Rabezzana | June 21, 1932 |
| 1,904,680 | Ferry | Apr. 18, 1933 |
| 1,926,349 | Nutt et al. | Sept. 12, 1933 |
| 2,057,354 | Withers et al. | Oct. 13, 1936 |
| 2,198,229 | Price | Apr. 23, 1940 |
| 2,221,905 | Berlin | Nov. 19, 1940 |
| 2,266,077 | Roan | Dec. 16, 1941 |
| 2,286,236 | Scott | June 16, 1942 |
| 2,410,849 | Waseige | Nov. 12, 1946 |
| 2,426,877 | Willgoos et al. | Sept. 2, 1947 |
| 2,454,293 | Waseige | Nov. 23, 1948 |
| 2,465,790 | Campbell | Mar. 29, 1949 |
| 2,475,011 | Chilton | July 5, 1949 |
| 2,477,501 | Tyler et al. | July 26, 1949 |
| 2,548,045 | Nichols | Apr. 10, 1951 |

FOREIGN PATENTS

| Number | Country | Date |
|---|---|---|
| 314,611 | Germany | Sept. 14, 1916 |
| 379,965 | Italy | Sept. 15, 1939 |
| 543,563 | Great Britain | Mar. 4, 1942 |